United States Patent [19]

Fullmer

[11] Patent Number: 5,406,268
[45] Date of Patent: Apr. 11, 1995

[54] PORTABLE MICROCOMPUTER WITH POWER-SPARING SYSTEM OF ILLUMINATED INDICATORS

[75] Inventor: Howard K. Fullmer, Hayward, Calif.

[73] Assignee: IQV Corporation, Pleasanton, Calif.

[21] Appl. No.: 713,510

[22] Filed: Jun. 12, 1991

[51] Int. Cl.⁶ .............................................. G09G 3/36
[52] U.S. Cl. .................. 340/815.42; 345/113
[58] Field of Search ............ 340/815.31, 716, 700,
340/765, 784, 815.42; 358/901; 364/707, 708,
710.01, 710.06; 345/113

[56] References Cited

U.S. PATENT DOCUMENTS

| | | | |
|---|---|---|---|
| 3,647,986 | 3/1972 | Lace et al. | 340/815.31 |
| 4,716,412 | 12/1987 | Arnoux et al. | 340/765 |
| 4,864,523 | 9/1989 | Sasaki | 364/708 |
| 4,945,350 | 7/1990 | Kawamura | 340/784 |
| 4,965,564 | 10/1990 | Fabry et al. | 340/784 |
| 5,053,765 | 10/1991 | Sonehara et al. | 340/815.31 |
| 5,068,652 | 11/1991 | Kobayashi | 340/815.31 |

OTHER PUBLICATIONS

Battery Watch II advertisement, PC Magazine vol. 9 No. 5 p. 139, Mar. 1990.

Primary Examiner—Jeffery Brier

[57] ABSTRACT

A portable microcomputer has a battery for powering the microcomputer. A display has a light source for illuminating the display. A system of illuminated indicators for indicating various operating states or functions of the microcomputer comprises a plurality of passive illuminated indicators, each deriving its visual signaling energy solely from the light source, and at least one active illuminated indicator indicating a condition related to the electrical power for the microcomputer and electrically powered by the battery. The passive indicators are effective, with no drain on the battery, except to change the state of an associated shutter, to provide necessary or desirable indications of various operating states or functions of the microcomputer when the microcomputer is being used and the display is active, only the active indicator draining the battery to provide said indication of electrical power.

30 Claims, 3 Drawing Sheets

PORTABLE MICROCOMPUTER WITH POWER-SPARING SYSTEM OF ILLUMINATED INDICATORS

BACKGROUND OF THE INVENTION

This invention relates to portable microcomputers, and more particularly to a system of illuminated indicators characterized by their conservation of battery power.

When the first microcomputer devices appeared in the late 1970's, their weight and size limited them to desktop use. However, as the utility of such devices became evident, there arose a need for devices which could be carried from the office for use at home or in some other remote location. The first "portable" microcomputers weighed in the order of 25 lbs. and were jokingly termed "luggables", typically consisting of a relatively large box of electronic components with a small CRT screen visible from one end of the box. Typical dimensions were 20" W×18" D×12" H.

The next generation of microcomputers typically took the form of a clamshell, having the display on one part of the shell. A display folded down over a base containing a keyboard and the electronic components. These "laptop" computers initially weighed well over 10 lbs. and, while portable, were too heavy and cumbersome to conveniently transport. Reduced height magnetic disk drives, thinner keyboards and other improvements brought down the size of the devices to about 14" W×13" D×2.5" H and the weight of the devices to 10 lbs. or slightly less.

Further improvements led to third generation devices, sometimes termed "notebook" computers, having dimensions in the order of 11' W×8.5" D×1.5" H. Notebook computers have roughly the footprint of an 8½×11 sheet of paper, but will fit in a briefcase. Typical weight is about 5.5-7 lbs.

To achieve this remarkable reduction in size and weight, all major components of the portable microcomputer have been downsized and rendered more energy efficient. Energy efficiency translates into smaller and lighter batteries, and/or longer battery life. Through large scale integration, computer circuitry has been greatly reduced in size, weight and power consumption. Magnetic disk drives have been downsized. Advances in display technolgy have resulted in larger, brighter and higher resolution displays without increase in weight.

The portable microcomputer has evolved to the point where reductions in weight and extensions of battery life are measured in small increments.

The typical microcomputer has a number of indicator lights, typically utilizing LEDs (light emitting diodes). Light-emitting diodes, however, are known to be undesirably energy-consumptive.

In the interest of further reducing battery weight and extending battery life, there exists a need for advances in indicator light technology.

OBJECTS OF THE INVENTION

It is an object of the present invention to provide a portable microcomputer having a system of illuminated indicators which are bright, space-conserving, and yet sparing in their energy consumption.

It is an associated object of the invention to provide a portable microcomputer having extended battery life.

DESCRIPTION OF THE PREFERRED EMBODIMENTS

This invention concerns a system of illuminated indicators for a portable microcomputer, and involves a recognition that visual indicators for a microcomputer may be divided into two groups. A first group may be termed "active" indicators, as they draw their power directly from the battery (or AC source when used), and indicate a condition or state of the power source itself—for example, a "battery active" indicator.

A much larger group of visual indicators for a microcomputer are those which are needed only when the main display is active. In accordance with this invention, the indicators in this second group derive their visual signaling energy from the light source for the main display and are herein termed "passive" indicators for that reason.

In accordance with this invention, since most of the visual indicators required or desired in a portable microcomputer are of the passive type, very significant energy savings result from the use of this invention. A number of embodiments of this invention will now be described wherein both passive and active visual indicators are utilized, the primary emphasis being directed to passive, power-saving arrangements for deriving visual signaling energy from the display light source.

Figure 1A:
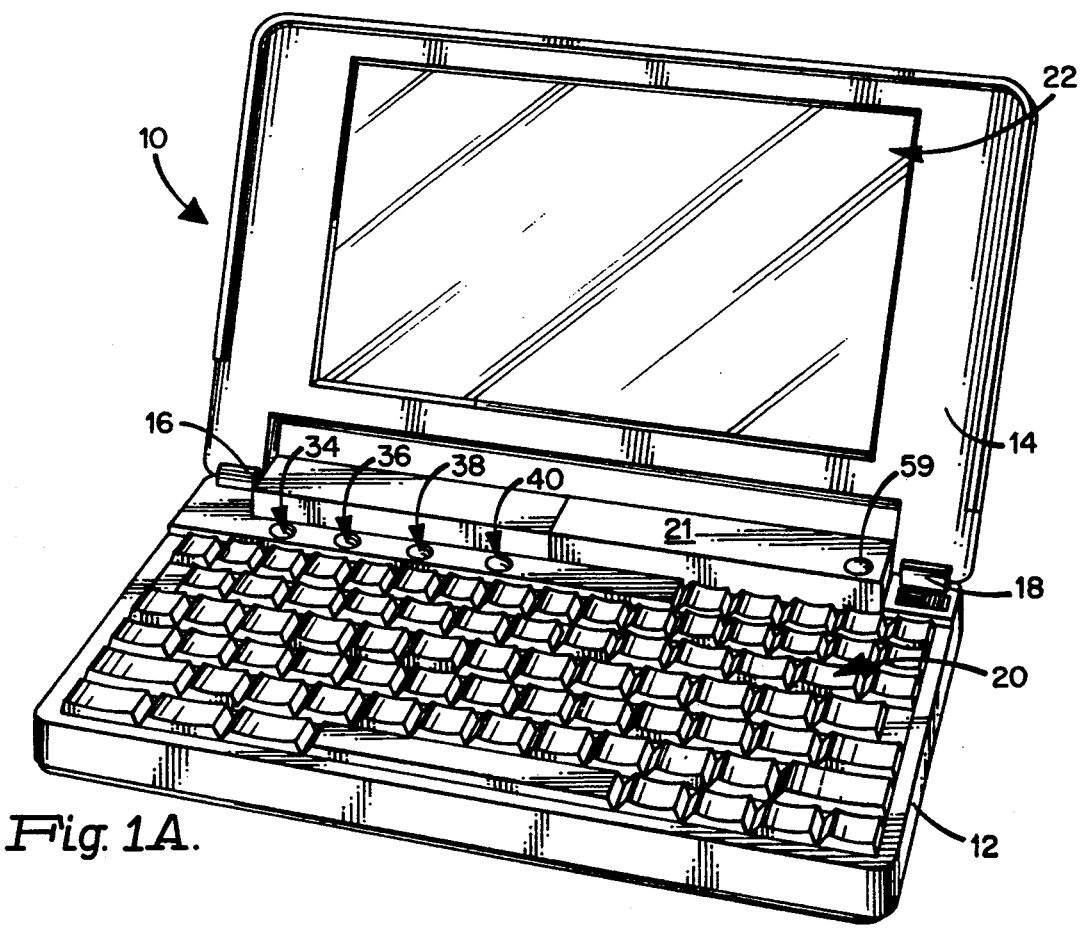
FIG. 1A is a perspective view of a microcomputer embodying a system of illuminated indicators embodying the present invention.
Figure 1B:
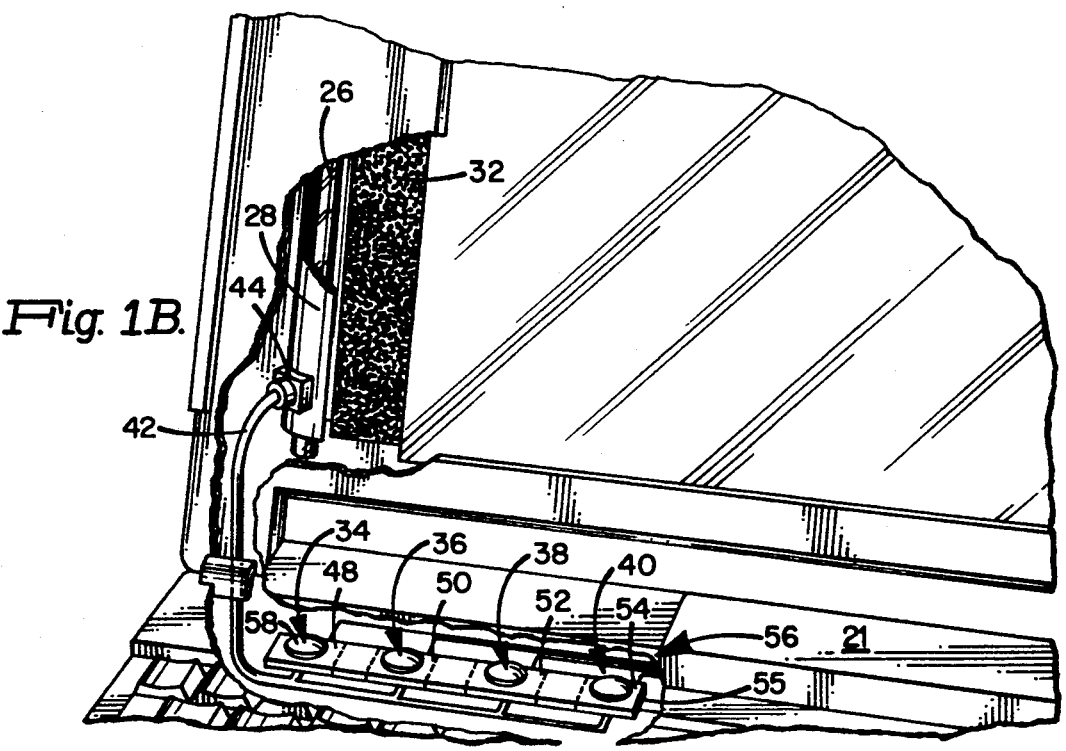
FIG. 1B is a fragmentary partially cut-away view of the microcomputer shown in FIG. A, illustrating the invention.
Figure 1C:
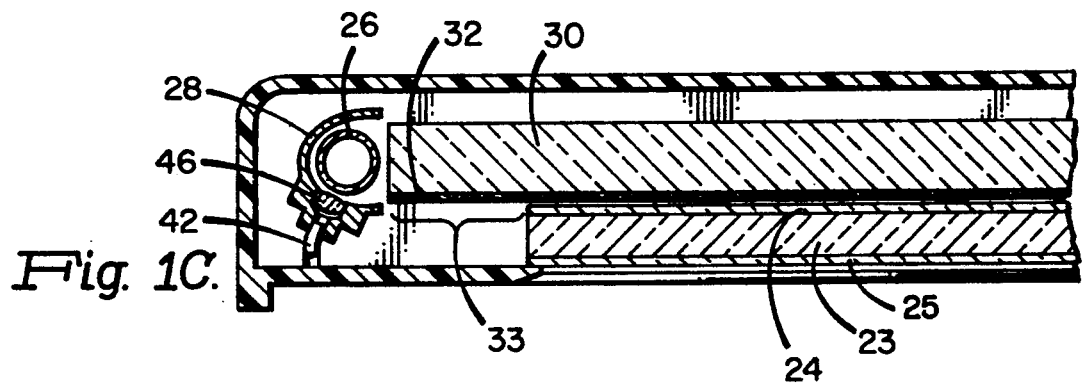
FIG. 1C is a fragmentary sectioned plan view of the FIGS. 1A-1B embodiment.

FIGS. 1A-1C Embodiment

The FIGS. 1A-1C microcomputer 10 is shown taking the form of a clamshell having a base panel 12 and a display panel 14 which are pivotally connected by a pair of hinges 16, 18. The base panel 12 contains a control panel, here illustrated as taking the form of a keyboard 20. Beneath the keyboard is a printed circuit board (not shown) which contain the CPU, memory, controllers, and other electronics. A detachable battery is shown at 21.

Display panel 14 houses a display 22 which may, for example, be a liquid crystal matrix 23 having front and rear polarizers 24, 25. In order to backlight the liquid crystal matrix 23, there is provided a light source, here shown as taking the form of a CFL (cold fluorescent lamp) 26. Radiation from the CFL 26 is reflected by a U-shaped reflector 28 into a light guide 30. A diffusive front surface 32 on the light guide scatters light conducted to the liquid crystal matrix 24 by the light guide 30 to produce an even illumination of the matrix 24.

A portion 33 of the guide 30 is not used to illuminate the liquid crystal matrix 23 because internally reflected light received by the guide 30 from the CFL 26 is not uniformly distributed in that region of the guide 30.

It is a stated object of the invention to provide a portable microcomputer having a system of illuminated indicators which is sparing of energy consumption during operation. In accordance with the illustrated preferred embodiment of the invention, illuminated indicator means are provided at one or more indicator locations. The illustrated FIGS. 1A–1C system is a hybrid system comprising both "active" indicators (as noted, herein intended to denote that visual signaling energy is electrically derived from the battery or an AC source), and "passive" indicators (herein intended to refer to those which, in accordance with the invention, drive visual signaling energy in the form of light bled off an existing light source such as the backlight source for the display).

As will be described, shutter means is provided for selectively turning the indicator or indicators on or off without extinguishing the light source means. By this invention, therefore, except as noted immediately hereafter the indicator(s) requires no independent power-consuming source of visual signaling energy. In an absolute sense, the only power required is the insignificant amount of electrical power which may be required to turn the indicators on or off or control their intensity.

In the FIGS. 1A–1C execution, a fiber optic bundle 42 is provided for collecting light from the CFL 26 and conducting it to four indicators 34, 36, 38, 40. The fiber optic bundle 42 is coupled to the reflector 28 by coupling assemby 44. A lens 46 mounted at the end of the coupling assembly collects light from the CFL through a wide angle and focuses it on the end of the fiber bundle 42 where it is conducted to the four indicators 34, 36, 38, 40.

At each indicator, there is disposed light valve means, here shown taking the form of four shutters 48, 50, 52, 54 constituting four areas of a liquid crystal device 55.

Electrical conduits for bringing activation voltages to the shutter areas of liquid crystal device 55 are illustrated at 56.

At each indicator, a lens 58 (optional) is disposed in an opening in the microcomputer casing in alignment with the end of a fiber optic strand. The end of the fiber optic strand addresses the lens 58 through the liquid crystal shutter in order that radiation emitting from the end of the fiber bundle 42, which occurs when the main display is active, may be turned off or on by appropriate energization of the liquid crystal shutters.

The fiber optic bundle 42 may pass through hinge 16 following techniques which are well known in the industry for passing conductors through portable microcomputer hinges.

While not illustrated, it is an obvious variant of the present invention to place the indicators on the display panel 14, in which case the fiber optic bundle 42 would not pass through the hinge, but the electrical conductors 56 for energizing the liquid crystal shutters would.

In such an alternative embodiment, the indicators could be arrayed together or separately on any of the marginal four areas of the display 22.

One "active" illuminated indicator for the FIGS. 1A–1C system is shown at 59 on the detachable battery 21. Indicator 59 may be a light-emitting diode deriving power for its visual signaling energy from the battery itself. This "battery active" indicator is needed to show that the battery is supplying power to the microcomputer, independently of whether the main display is active. (The display may have been temporarily turned off by the microcomputer's power management system to save battery drain, for example.)

Figure 2A:
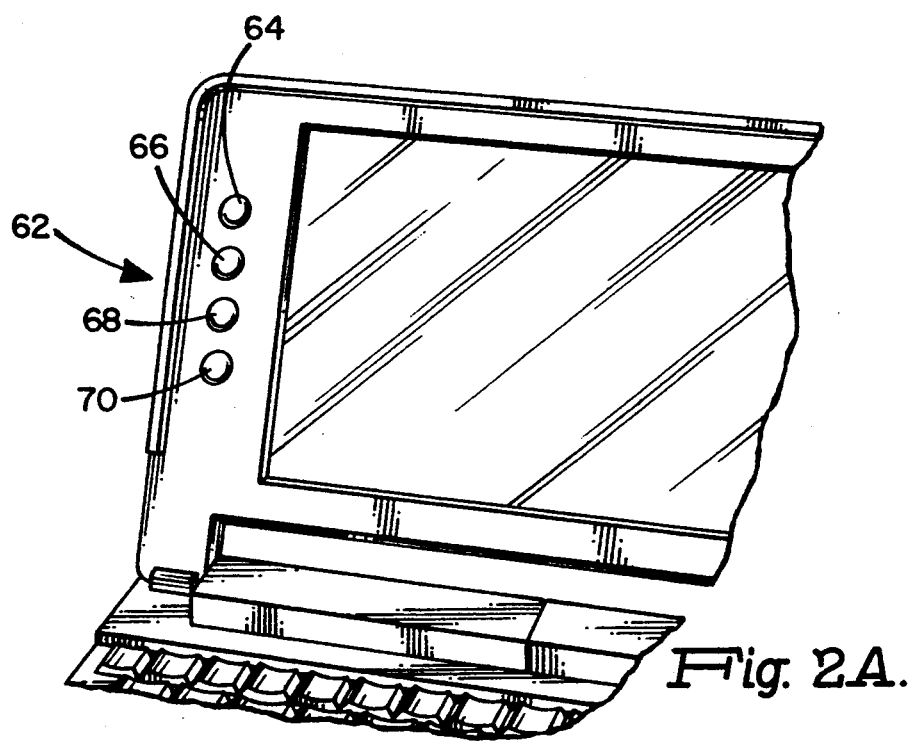
FIGS. 2A and 2B illustrate an alternative embodiment of the invention.
Figure 2B:
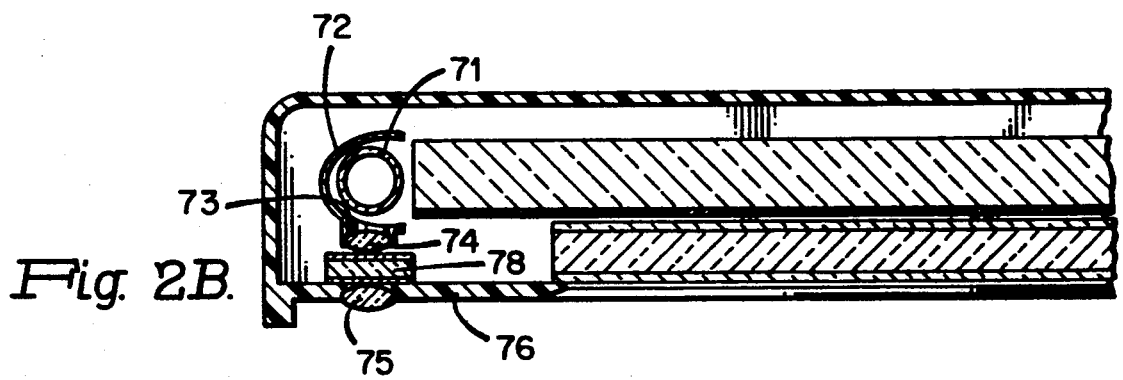

FIGS. 2A–2B Embodiment

FIGS. 2A–2B illustrate an alternative embodiment of the invention in a portable microcomputer 62 having four passive illuminated indicators 64, 66, 68, 70. As shown clearly in FIG. 2B, light from a CFL 71 radiates through openings in a reflector 72, one of which openings is shown at 73. To increase the collection angle, a lens 74 disposed in the opening 73 focuses collected light on a second lens 75 mounted in an opening in the casing 76 for the microcomputer. Light shutters for each of the indicators, one of which is shown at 78, are used to turn the indicators off or on or modulate their intensity in a steady state or fluctuating manner.

In accordance with the present invention, there is provided a portable microcomputer having a system of illuminated indicators which require little or no power and yet which provide a bright visual indication of some condition or operating parameter or function of the microcomputer, such as operation of a magnetic disk drive, system power on, CAPS LOCK, NUM LOCK, PAD LOCK, SCROLL LOCK, etc. The only power required by these passive indicators is an insignificant amount necessary to change the state of the liquid crystal light shutter. No visual signaling power whatsoever is needed.

Figure 3A:
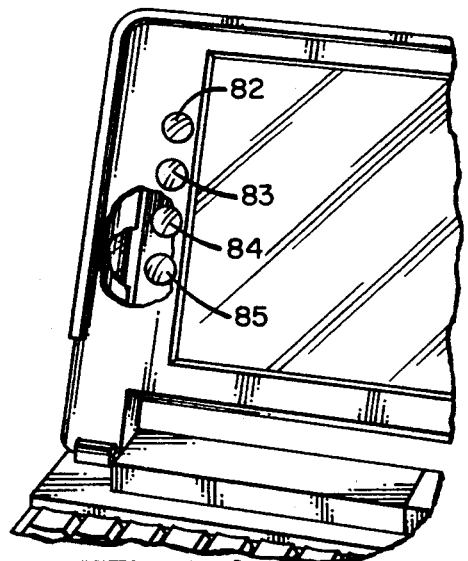
FIGS. 3A-3B depict a third embodiment of the invention.
Figure 3B:
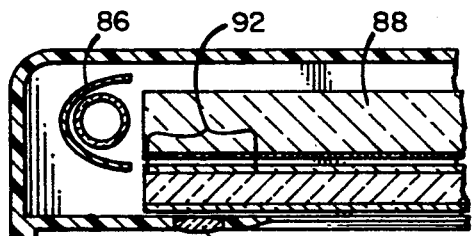

FIGS. 3A and 3B illustrate yet another embodiment of the invention wherein a normally unused transition section 80 in a backlit-type display for a microcomputer is used as a source of luminous energy for a plurality of passive illuminated indicators, 82, 83, 84, 85.

While the illumination of the front face of the transition section 80 is uneven due to the sharp angles at which the light emitted by CFL 86 impinges on the internal surfaces of a light guide 88, nevertheless the transition section 80 provides a very adequate source of illumination for indicators in accordance with the present invention.

As in the above-described FIGS. 2A, 2B embodiment, lenses, one of which is shown at 90 in an opening in the display panel casing, collects light emanating from the front face of the transition section 80 of the light guide 88.

Shutter means for the indicators is provided by a liquid crystal shutter means, preferably taking the form of a laterally extending portion 92 of the main liquid crystal matrix 94. The portion 92 extends vertically behind the lenses 90 in a manner similar to the liquid crystal device 55 described above in connection with the FIGS. 1A-1C embodiment. Areas of the portion 92 of liquid crystal matrix 94 behind each lens 90 are activated through electrical conductors (not shown) to selectively turn the illuminated indicators on or off or alter their intensity in a steady state or fluctuating manner.

Figure 4B:
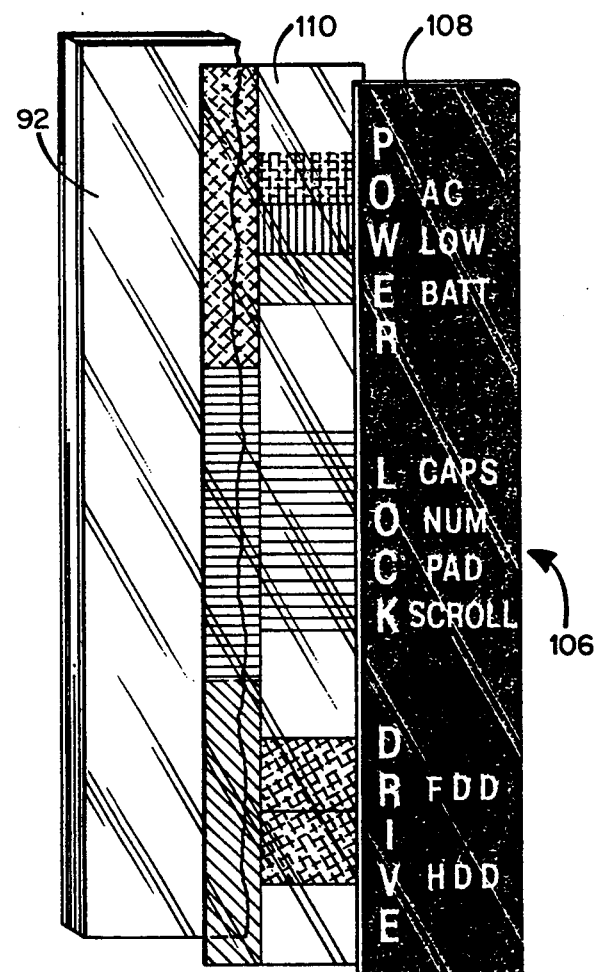
FIGS. 4A-4B depict a fourth embodiment of the invention.
Figure 4A:
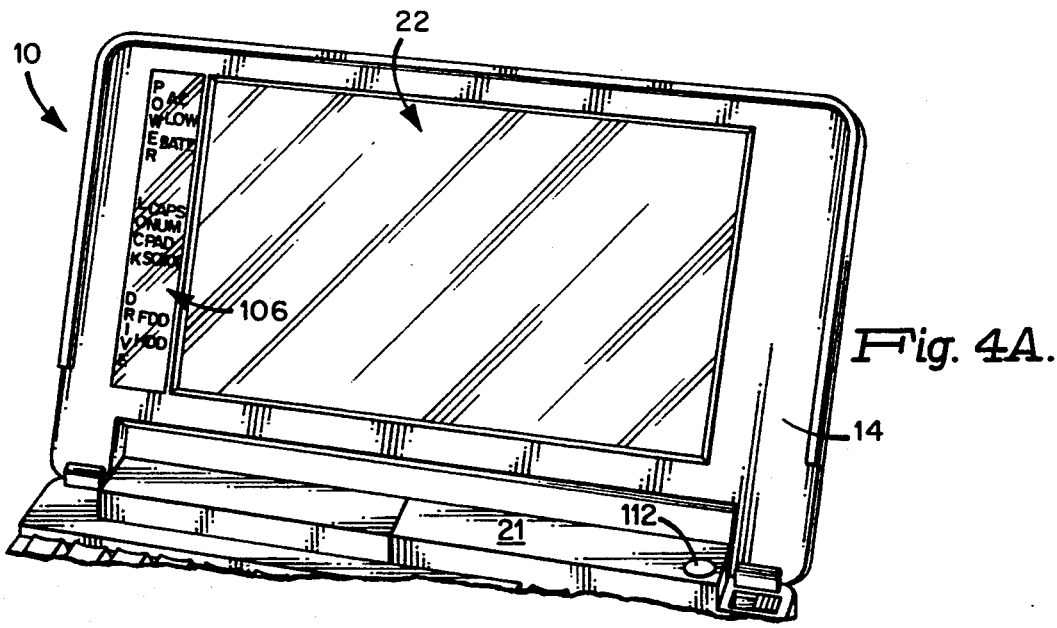

A preferred embodiment of the invention is depicted in FIGS. 4A–4B. In the FIGS. 4A–4B embodiment the illuminated indicators are elaborated into a display comprising various symbols or legends which appear in different forms, colors and potential states of activation.

The FIGS. 4A–4B embodiment is illustrated as including a base panel 100 and a display panel 102 which may have a general construction as described above. The illuminated indicator arrangement may be similar to that illustrated and described above in connection with FIGS. 3A–3B, however, rather than having simply an array of indicators 82, 83, 84, 85, the FIGS.

4A-4B arangement comprises an indicator panel 104 with an array of illuminated, function-indicating symbols or legends, here shown, by way of example, as "POWER", and subsidiary legends "AC", "LOW" and "BATTERY"; "LOCK", and subsidiary legends "NUM" "PAD" and "SCROLL"; and "DRIVE", and subsidiary legends "FDD" and "HDD".

Exploded FIG. 4D reveals the indicator panel 104 as comprising a front plate 106, which may be composed of glass or suitable transparent plastic, on the back of which is screened a light-opaque stencil having clear areas which define the above-described symbols and legends.

Behind the stenciled front plate 106 is a geometrical array of filters 110 which may have any desired colors, an exemplary selection being indicated. The array of filters 110 is preferably silk screened onto the back of the stenciled front plate 106. Behind the array of filters 110 is an extension 92 of a liquid crystal main display which may be as in the FIGS. 3A-3B embodiment.

Because the shutter means, here shown as an extension 92 of the liquid crystal display, can be controlled to change its light transmissivity in any area, any of the symbols or legends on the front plate 106 can be caused to remain on, off, or fluctuating in intensity as determined by appropriate control of the coextensive areas of the extension 92 of the liquid crystal display. By virtue of the different colored filters impressed behind the different legends, an attractive and highly functional arrangement of illuminated function indicators is created with various symbols and legends appearing in different colors and in different steady state or fluctuating states of illuminations, as desired. In the present arrangement, the legends "POWER", "LOCK", and "DRIVE" are preferably maintained on at all times when the main display is active; others of the legends will be caused to be extinguished or blinking, as desired.

In the illustrated FIGS. 4A-4B embodiment, the system of illuminated function indicators also includes one or more indicators which do not depend on the main display being active. By way of example, the detachable battery 21 has an indicator light 112 which indicates that the battery 21 is active and supplying power to the system. Indicator light 112 draws its energy from the battery 21 and is thus not dependent upon the activation of the main display 114.

While particular embodiments of the invention have been shown and described, it will be obvious to those skilled in the art that changes and modifications may be made without departing from the invention in its broader aspects. Therefore the aim of the appended claims is to cover all such changes and modifications as fall within the true spirit and scope of the invention.

What is claimed is:

1. A portable microcomputer comprising:
   a battery for powering said microcomputer;
   a display having light source means for illuminating said display; and
   a system of illuminated indicators for indicating various operating states or functions of the microcomputer, comprising:
   a plurality of passive illuminated indicators, each deriving its visual signaling energy solely from said light source means; and
   at least one active illuminated indicator indicating a condition related to the electrical power for the microcomputer and electrically powered by said battery,
   said passive indicators being effective, with no drain on said battery, while in a particular state to provide necessary or desirable indications of various operating states or functions of the microcomputer when the microcomputer is being used and said display is active, only said active indicator draining said battery to provide said indication of electrical power.

2. The microcomputer defined by claim 1 wherein said display comprises an X-Y matrix display, and wherein said light source means comprises a backlight source for backlighting said display.

3. The microcomputer defined by claim 2 including means for directing light from said backlight source to said passive illuminated indicators.

4. The microcomputer defined by claim 3 including shutter means for selectively altering the transmission of light from said light source to at least one of said plurality of passive indicators.

5. The microcomputer defined by claim 4 wherein said display is a liquid crystal display, and wherein said shutter means comprises a portion of said liquid crystal display which is not utilized for computer output display purposes.

6. The microcomputer defined by claim 3 wherein said means for directing light from said backlight source comprises a fiber optic light guide means.

7. The microcomputer defined by claim 1 wherein said active indicator is a light-emitting diode for indicating an active condition of said battery powering said microcomputer.

8. The microcomputer defined by claim 3 wherein said backlight source is a cold fluorescent lamp having a reflector, and wherein said means for directing comprises a direct opening through said reflector to constitute said passive indicator.

9. The microcomputer defined by claim 3 wherein said backlight source is a cold fluorescent lamp having a reflector, and wherein said means for directing includes a planar light guide and diffuser means receiving light from said lamp and reflector for conducting light to and illuminating said X-Y matrix display, said guide and diffuser means including a transition section between said lamp and an active portion of said display which is masked to provide one or more of said passive indicators.

10. The microcomputer defined by claim 9 including shutter means for selectively altering the transmission of light from said lamp to at least one of said plurality of passive indicators.

11. The microcomputer defined by claim 10 wherein said display is a liquid crystal display and wherein said shutter means comprises an extension of said liquid crystal display which is not utilized for computer output display purposes.

12. A portable microcomputer comprising:
    light source means;
    an illuminated indicator system comprising a plurality of indicator means at a plurality of indicator locations, said system comprising means for bleeding light from said light source means and directing it to each of said indicator means; and
    shutter means for selectively altering the transmission of light from said light source means to at least one of said plurality of said indicator means.

13. The microcomputer defined by claim 12 wherein said light source means comprises a display backlight source for backlighting an X-Y matrix display constituting part of said microcomputer.

14. The microcomputer defined by claim 13 wherein said shutter means comprises a liquid crystal device.

15. The microcomputer defined by claim 14 wherein said display is a liquid crystal display, and wherein said liquid crystal device comprises an extension of said liquid crystal display which is not utilized for computer output display purposes.

16. The microcomputer defined by claim 12 wherein said means for bleeding and directing comprises fiber optic light guide means.

17. The microcomputer defined by claim 13 wherein said backlight source is a cold fluorescent lamp having a reflector, and wherein said means for bleeding and directing comprises a direct opening through said reflector to said indicator means.

18. The microcomputer defined by claim 13 wherein said backlight source is a cold fluorescent lamp having a reflector, and wherein said means for bleeding and directing includes a planar light guide and diffuser means receiving light from said lamp and reflector.

19. The microcomputer defined by claim 18 wherein said display is a liquid crystal display, and wherein said shutter means comprises an extension of said liquid crystal display positioned between said transition section and a viewer for selectively controlling light passing between said transition section and the viewer.

20. The microcomputer defined by claim 13 wherein said means for bleeding and directing includes stencil means for defining a plurality of luminous symbols or legends corresponding to various operating states or functions of the microcomputer.

21. The microcomputer defined by claim 20 including color filter means adjacent said stencil symbols or legends for differently coloring light from said different ones of said symbols or legends.

22. A portable microcomputer comprising:
a battery for powering said microcomputer;
an LCD display having a backlight means for illuminating the display comprising a light source and a planar light guide for guiding and diffusing light across said LCD display, said LCD display and backlight means having a main portion serving as an output device for said microcomputer and an auxiliary portion along at least one margin thereof; and
a system of illuminating indicators for indicating various operating states or functions of the microcomputer, comprising:
a plurality of passive illuminated indicators, each deriving its visual signaling energy solely from said auxiliary portion of said LCD display and thereby placing no drain on said battery; and
at least one active illuminated indicator indicating a condition related to the electrical power for the microcomputer and electrically powered by said battery,
said passive indicators being effective, with no drain on said battery, while in a particular state to provide necessary or desirable indications of various operating states or functions of the microcomputer when the microcomputer is being used and the display is active, only said active indicator draining said battery to provide said indication of system electrical power.

23. The microcomputer defined by claim 22 wherein said auxiliary portion of said LCD display functions as shutter means for selectively altering the transmission of light from the auxiliary portion of said backlight means to a viewer.

24. A portable microcomputer comprising:
a display including an X-Y matrix of pixel light valves and light source means for backlighting said matrix; and
illuminating indicator means at an indicator location, comprising means for directing light from said light source to said indicator means.

25. The microcomputer defined by claim 24 wherein said light source means includes a reflector, and wherein said means for directing light comprises openings formed in said reflector for exposing said indicator locations to said light source.

26. The microcomputer defined by claim 24 wherein said means for directing light comprises a fiber optic light guide.

27. The microcomputer defined by claim 26 wherein said indicator locations are plural in number and arrayed along one or more margins of said display, and wherein said fiber optic light guide conducts light from said light source means to said indicator locations.

28. The microcomputer defined by claim 26 which comprises a base panel and a display panel hinged together by hinge means, wherein said indicator locations are on said base panel and wherein said display panel contains said light source means, said fiber optic light guide passing through said hinge means to conduct light from said light source means to said indicator locations.

29. A portable microcomputer comprising:
an X-Y matrix display and light source means for backlighting said display;
illuminated indicator means at one or more indicator locations comprising fiber optic means for collecting and guiding light from said light source means to said indicator locations; and
shutter means for interrupting the transmission of light from said light source to said indicator locations for selectively turning said indicator or indicators on or off without extinguishing said light source.

30. The microcomputer defined by claim 29 including first and second panels wherein said light source means is in a first panel and wherein said indicator locations are in said second panel, said first and second panels being pivotally interconnected by hinge means, said fiber optic light guide passing through said hinge means conduct light from said first panel to said indicator locations in said second panel.

* * * * *